United States Patent
Kao

(10) Patent No.: US 7,426,608 B1
(45) Date of Patent: Sep. 16, 2008

(54) METHOD AND APPARATUS FOR CONSTRUCTING A SEARCH KEY

(75) Inventor: Sophia W. Kao, Cupertino, CA (US)

(73) Assignee: RMI Corporation, Cupertino, CA (US)

( * ) Notice: Subject to any disclaimer, the term of this patent is extended or adjusted under 35 U.S.C. 154(b) by 693 days.

(21) Appl. No.: 10/789,668

(22) Filed: Feb. 27, 2004

Related U.S. Application Data

(63) Continuation-in-part of application No. 10/735,107, filed on Dec. 12, 2003, now Pat. No. 7,234,019.

(51) Int. Cl.
*G06F 12/00* (2006.01)
(52) U.S. Cl. .................. 711/108; 711/118
(58) Field of Classification Search ............ 711/108, 711/118
See application file for complete search history.

(56) References Cited

U.S. PATENT DOCUMENTS

2004/0228370 A1* 11/2004 Riesenman et al. ......... 370/537

* cited by examiner

*Primary Examiner*—Reginald G. Bragdon
*Assistant Examiner*—Mehdi Namazi
(74) *Attorney, Agent, or Firm*—Zilka-Kotab, PC

(57) ABSTRACT

A search key construction system including search key sections, each coupled to an output of a first multiplexer having a first programmable control, a second multiplexer having a second programmable control and an output coupled to the first multiplexer, and a third multiplexer having a third programmable control and an output coupled to the first multiplexer is disclosed. The first programmable control can include a key source select to enable one of a first type path, a second type path, and a third type path. The first type path can include a designated section position from a packet header, the second type path can include a short field from a packet attribute, and the third type field can include a long field from a packet header.

18 Claims, 5 Drawing Sheets

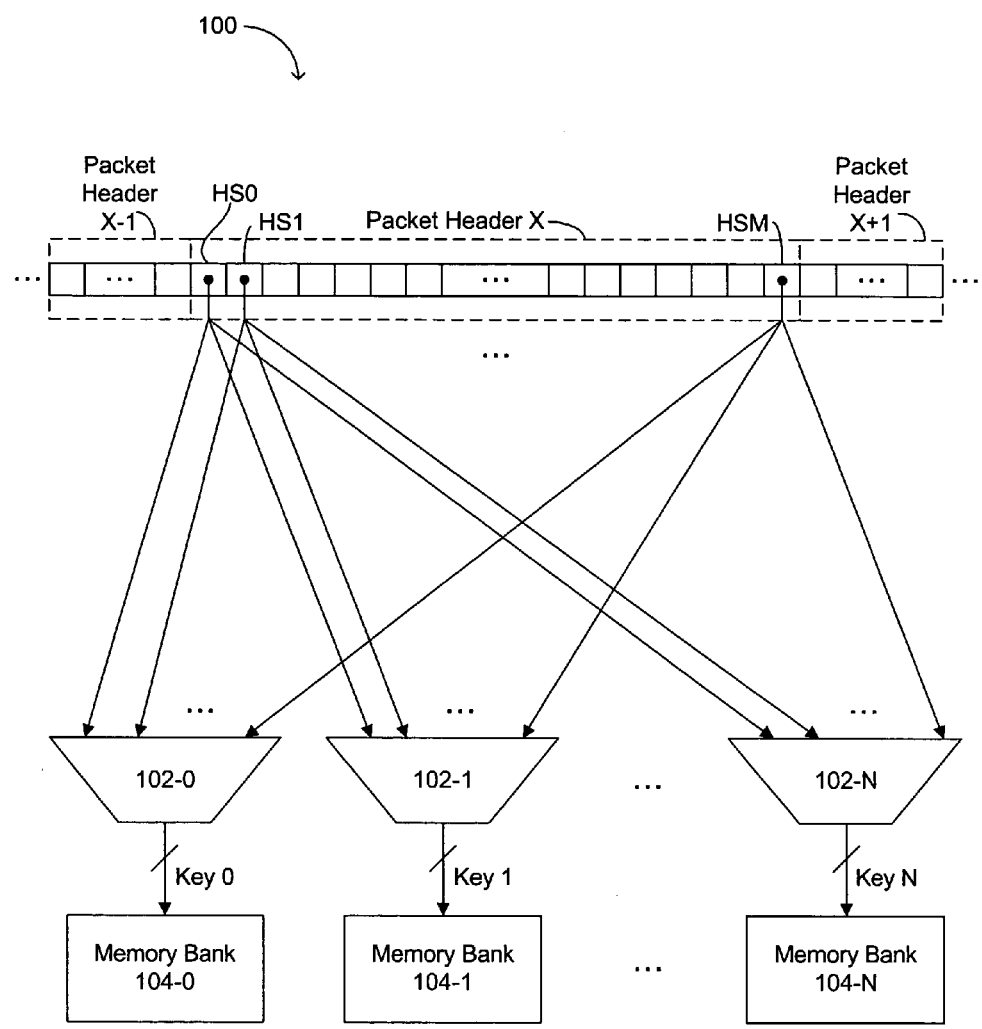
FIG. 1 (conventional)

METHOD AND APPARATUS FOR CONSTRUCTING A SEARCH KEY

RELATED APPLICATIONS

This application is a continuation in part of U.S. Ser. No. 10/735,107 filed Dec. 12, 2003, now U.S. Pat. No. 7,234,019 incorporated herein by reference.

FIELD

The invention relates generally to the field of classification engines and, more particularly, to a method and apparatus for constructing a search key from a packet.

BACKGROUND

In networking systems, routers and/or switches typically move packets of information from one of a number of input ports to one or more output ports. A lookup function, which can be implemented as a hardware "search engine" or the like, can include content addressable memory (CAM) and/or standard memory, such as static random-access memory (SRAM). While the SRAM may commonly be accessed using "hashing" to essentially provide a "many-to-one" function, a search engine in general requires a search key to be applied. Such search keys are generally derived from packet headers and/or packet attributes. Further, typical systems include multiple memory bank organizations to facilitate parallel searching and the search keys must be constructed and allocated to one or more of these memory banks.

Referring now to FIG. 1, a block diagram of a conventional key construction approach is shown and indicated by the general reference character 100. An incoming stream of packet headers is shown as Packet Header X−1, Packet Header X, and Packet Header X+1. As shown for Packet Header X, each header can be divided into equal-sized sections or fields: HS0, HS1, . . . HSM. Each section of the packet can be mapped to each memory bank through corresponding multiplexers. Accordingly, each section HS0, HS1, through HSM can map to Memory Bank 104-0 via multiplexer 102-0 providing Key 0. Similarly, HS0-HSM can map to Memory Bank 104-1 via multiplexer 102-1 providing Key 1 and so on through Memory Bank 104-N receiving Key N through multiplexer 102-N. In this fashion, each section or field of a packet header can be allocated to a designated memory bank.

However, this conventional approach has several drawbacks, such as the die area consumed by these relatively large and complex multiplexer functions. Further, in many applications, searches to particular memory banks can be broken up according to the type of search and this means that the same packet header section does not have to be allocated to each memory bank. Also, this conventional approach is not flexible so as to be optimized to meet different user requirements or applications.

Consequently, what is needed is a key construction system that: (i) efficiently allocates packet header sections to search memory banks so as to reduce die size by decreasing circuit complexity; and (ii) provides user programmable flexibility in the packet header and/or attribute section to search memory bank allocation.

SUMMARY

The invention overcomes the identified limitations of conventional approaches and provides an improved solution having multiple advantageous features.

According to embodiments of the invention, a search key construction system can include search key sections, each coupled to an output of a first multiplexer having a first programmable control, a second multiplexer having a second programmable control and an output coupled to the first multiplexer, and a third multiplexer having a third programmable control and an output coupled to the first multiplexer. The first programmable control can include a key source select to enable one of a first type path, a second type path, and a third type path. The first type path can include a designated section position from a packet header, the second type path can include a short field from a packet attribute, and the third type field can include a long field from a packet header.

According to another aspect of embodiments of the invention, a method of constructing a search key can include the steps of (i) programming bank key construction settings; (ii) passing a first type programmed field to a key section if a first type path is enabled; (iii) passing a second type programmed field to the key section if a second type path is enabled; and (iv) passing a third type field to the key section if the first type path and the second type path are both disabled. The first type path can include a long field from a packet header, the second type path can include a short field from a packet attribute, and the third type field can include a designated section position from a packet header.

Advantages of the invention include a reduced die size component due to a more efficient multiplexer arrangement as well as added flexibility by allowing user programming of packet header and/or attribute section allocation to the search memory banks. As an alternative to conventional approaches, such as those that strictly allow any location of a packet header to be muxed into any location in each memory bank, embodiments of the invention can provide: (i) a limited number of pre-selected long meaningful fields identified in the packet header to significantly reduce mux combinations without limiting key selections; (ii) short meaningful fields containing those fields not already included in the long fields; (iii) a limited number of total user fields (e.g., 2 or 4) with mapping to all memory banks that require fully programmable offset header bytes; and (iv) maximum flexibility and key generation combinations by providing independent selection of each 16-bit field.

BRIEF DESCRIPTION OF THE FIGURES

Embodiments of the invention are described with reference to the FIGS, in which:

FIG. 1 is a block diagram of a conventional key construction approach;

DETAILED DESCRIPTION

Embodiments of the invention are described with reference to specific diagrams depicting system arrangements and methods. Those skilled in the art will recognize that the description is for illustration and to provide the best mode of practicing the invention. The description is not meant to be limiting. While a specific number of key construction portions as well as a number of memory banks in a system are shown, those skilled in the art will recognize that the invention is applicable to other numbers of key constructions and/or memory banks or the like as well. Further, numbers of bits in constructed keys or certain fields or the like are merely exemplary and should not be construed as limiting the scope of the invention.

Figure 2:
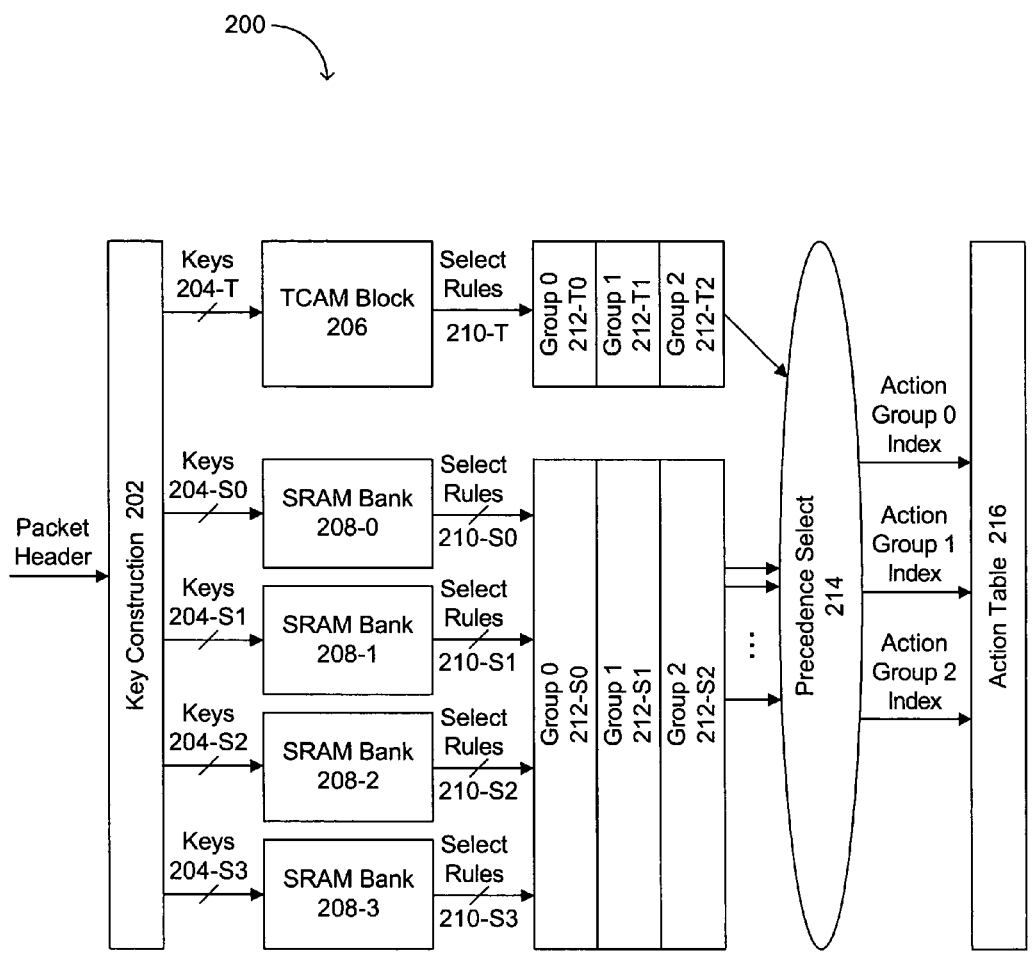
FIG. 2 is a block diagram of a classification engine according to an embodiment of the invention.

Referring now to FIG. 2, a block diagram of a classification engine according to an embodiment of the invention is shown and indicated by the general reference character 200. A Packet Header can be received by block Key Construction 202. Accordingly, the constructed keys can include information taken from a packet. For example, if an incoming packet header is up to 140B long, 16 constructed keys of up to 256-bits each may be parsed from the packet header. The searching of these 16 constructed keys can then be done essentially in parallel fashion. Examples of types of packet headers that can be used for key construction include Internet Protocol (IP) and Media Access Control (MAC) type addresses. Further, other sources for constructed keys can include, for example, packet attributes identified and/or assigned by a packet parser, programmable offset values extracted from packet headers, predefined protocol fields, and/or packet profiles. Here, embodiments may provide a classification engine function whereby a packet header can be matched with a particular rule.

In FIG. 2, Key Construction 202 can provide Keys 204-T to TCAM Block 206, Keys 204-S0 to SRAM Bank 208-0, Keys 204-S1 to SRAM Bank 208-1, Keys 204-S2 to SRAM Bank 208-2, and Keys 204-S3 to SRAM Bank 208-3. Of course, the four SRAM bank and one TCAM block arrangement shown in FIG. 2 represents only one example implementation. Any number of SRAM banks and/or TCAM blocks or banks could be used in accordance with embodiments of the invention. In FIG. 2, a search result from TCAM Block 206 can include Select Rules 210-T provided to Group 0 212-T0, Group 1 212-T1, or Group 2 212-T2, depending on the group designation of the search, for example. Search results from the SRAM banks can include Select Rules 210-S0 from SRAM Bank 208-0, Select Rules 210-S1 from SRAM Bank 208-1, Select Rules 210-S2 from SRAM Bank 208-2, and Select Rules 210-S3 from SRAM Bank 208-3, for example. Each of these search results from the SRAM banks can be provided to Group 0 212-S0, Group 1 212-S1, or Group 2 212-S2, depending on the group designation of the search, for example. For each of the groups, search results including the appropriate precedence levels, can be provided to Precedence Select 214, which can determine a "winner" or overall priority hit search result for each group. Action Table 216 can receive the winning index for groups 0, 1, and 2: Action Group 0 Index, Action Group 1 Index, and Action Group 2 Index, respectively.

Figure 3:
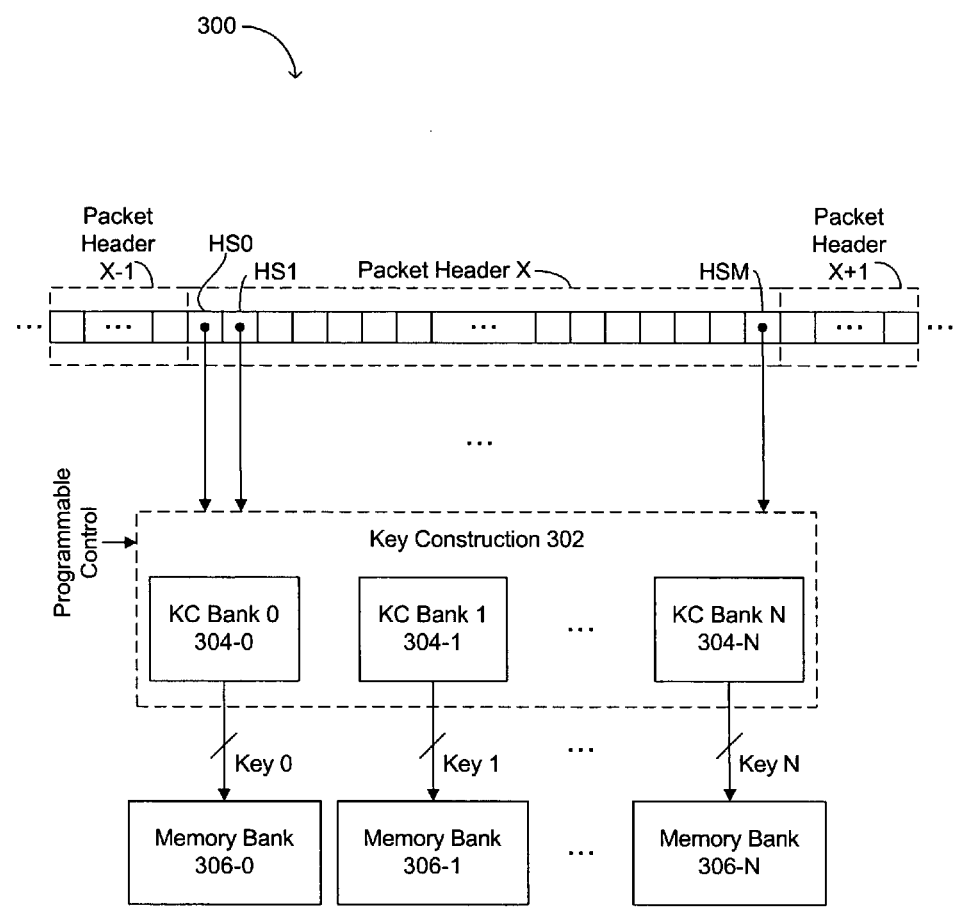
FIG. 3 is a block diagram of a key construction approach according to an embodiment of the invention.

Referring now to FIG. 3, a block diagram of a key construction approach according to an embodiment of the invention is shown and indicated by the general reference character 300. In this example, an incoming stream of packet headers may be similar to that shown in FIG. 1: Packet Header X−1, Packet Header X, and Packet Header X+1. Also, as shown for Packet Header X, each header can be divided into equal-sized sections or fields: HS0, HS1, . . . HSM. However, in FIG. 3, each section or field of the packet can be input to Key Construction 302. The key construction block may include Key Construction (KC) portions for each memory bank. For example, KC Bank 0 304-0 can provide Key 0 to Memory Bank 306-0. Similarly, KC Bank 1 304-1 can provide Key 1 to Memory Bank 306-1 and so on through KC Bank N 304-N providing Key N to Memory Bank 306-N. The memory banks can be, for example, Ternary CAM (TCAM) and/or SRAM type memory. As one example, each key provided to a TCAM bank can be 128-bits wide and two such keys may be concatenated or "cascaded" to form an effective 256-bit key to provide to an SRAM bank. In addition, Key Construction 302 can receive Programmable Control. This programmable control can allow the user to program which sections of a packet header can be allocated to a designated memory bank, for example.

Figure 4:
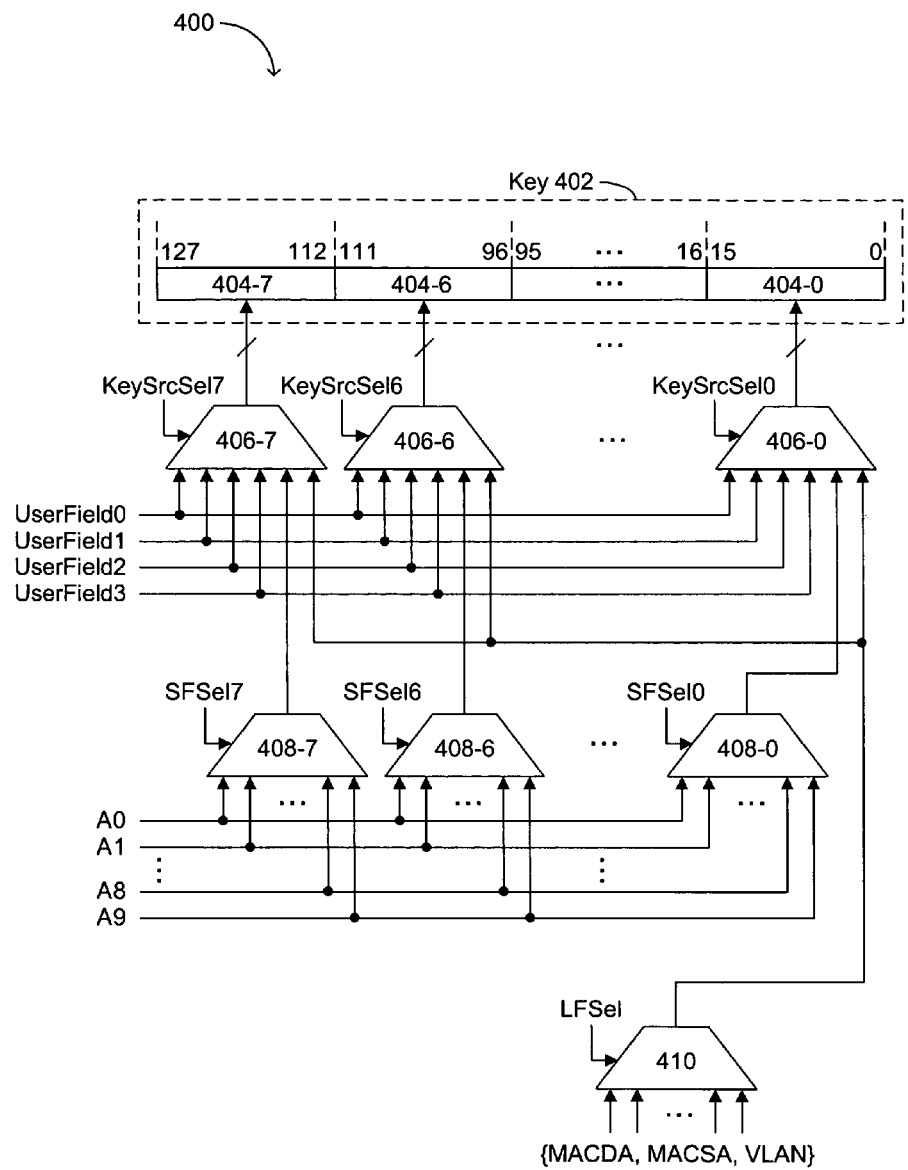
FIG. 4 is a detailed block diagram of a key construction approach for a memory bank according to an embodiment of the invention.

Referring now to FIG. 4, a detailed block diagram of a key construction approach for a memory bank according to an embodiment of the invention is shown and indicated by the general reference character 400. This diagram can represent more detail for one of the blocks KC Bank 304-0 through KC Bank 304-N shown in FIG. 3. In FIG. 4, Key 402 can represent a constructed key for a particular bank of memory to be searched. Key 402 can include, for example, 16-bit sections, such as section 404-0 for bits 0-15, through section 404-6 for bits 96-111 and section 404-7 for bits 112-127. Accordingly, in this very particular example, a 128-bit search key can be divided into eight 16-bit sections where each section can be controlled by user programmed signals, as will be discussed in more detail below. As one skilled in the art will recognize, different combinations, such as sections less than 16-bits wide and/or search keys greater than 128-bits wide could be implemented in accordance with embodiments of the invention.

The example key construction of FIG. 4 also includes multiplexer 406-0, which can provide Key 402 section 404-0. Inputs to multiplexer 406-0 can include user programmable fields UserField0-3, an output from multiplexer 408-0, and an output from multiplexer 410. Also, programmable control signal KeySrcSel0 can control the selection or path to be enabled in multiplexer 406-0. The UserField0-3 paths may indicate designated sections from a packet header to be included in the search key to be constructed. For example, bits 0-15 from a UserField0 may indicate a particular 16-bit section as determined by offset addressing from the packet header and/or packet attribute. The type or content of these UserField0-3 fields derived from a packet header may not be known by a user. Rather, designated positions in the packet header can be allocated using these fields. UserField0-3 may also connect to the other multiplexers that can provide Key 402 section bits, as shown through multiplexer 406-6 providing section 404-6 and multiplexer 406-7 providing section 404-7. Also, each of the 406-0 through 406-6 and 406-7 multiplexers, which can form a "selection level" in the hierarchical system, can receive associated programmable control signals KeySrcSel0 through KeySrcSel6 and KeySrcSel7, respectively. In addition, the user programmable fields may be shared among other memory banks in a system so that these fully programmable fields may be selected only once per system, for example. Also, as an alternative embodiment, only two user programmable fields may be included in the system so as to further reduce the size of the circuit implementation.

Multiplexers 408-0 through 408-6 and 408-7 can form a Short Field (SF) path as part of another selection level in the hierarchical key construction system. For selection control, each of these multiplexers can receive an associated programmable control signal SFSel0 through SFSel6 and SFSel7, respectively. SFSel0-7 may indicate a particular "short" field, such as a group of 2, 3, 5 or 10-bit (i.e., less than 16-bits) wide fields, for example, to select. Examples of such short fields include known or "meaningful" fields typically found in a fixed location in a packet attribute, such as Class of Service (CoS) and/or packet type indications. The short field paths can be indicated by A0, A1, ... A8, and A9, which can be input to each of multiplexers 408-0 through 408-6 and 408-7, as shown in FIG. 4. Further, an output from each of 408-0 through 408-7 can connect to a corresponding one of multiplexers 406-0 through 406-7. In this fashion, each section of Key 402 may include a designated short field from a packet header and/or packet attribute.

Multiplexer 410 can form a Long Field (LF) path as part of another selection level in the hierarchical key construction system and it can receive programmable control signal LFSel. LFSel may indicate predefined groups of fields, which can be known or "meaningful" fields, to select. Examples of such long fields include standard 5-tuple (IP source address, IP destination address, L4 source port, L4 destination port, L3 protocol), and/or IPv6 addresses, Media Access Control Destination Address (MACDA), Media Access Control Source Address (MACSA), and/or Virtual Local Area Network (VLAN). Further, an output from multiplexer 410 can connect to each of multiplexers 406-0 through 406-7. The output of 410 may be, for this example, 128-bits and bits 0-15 may be applied to multiplexer 406-0, and so on through bits 96-111 applied to multiplexer 406-6 and bits 112-127 applied to multiplexer 406-7. In this fashion, each section of Key 402 may include a portion of a designated long field from a packet header and/or packet attribute. The programmable structure allows a user to program an entire "long" field, including all 128-bits, to the constructed key or one or more 16-bit sections of the key may be replaced or "overridden" by either a "short" field or a portion in the UserField0-3, for example.

Figure 5:
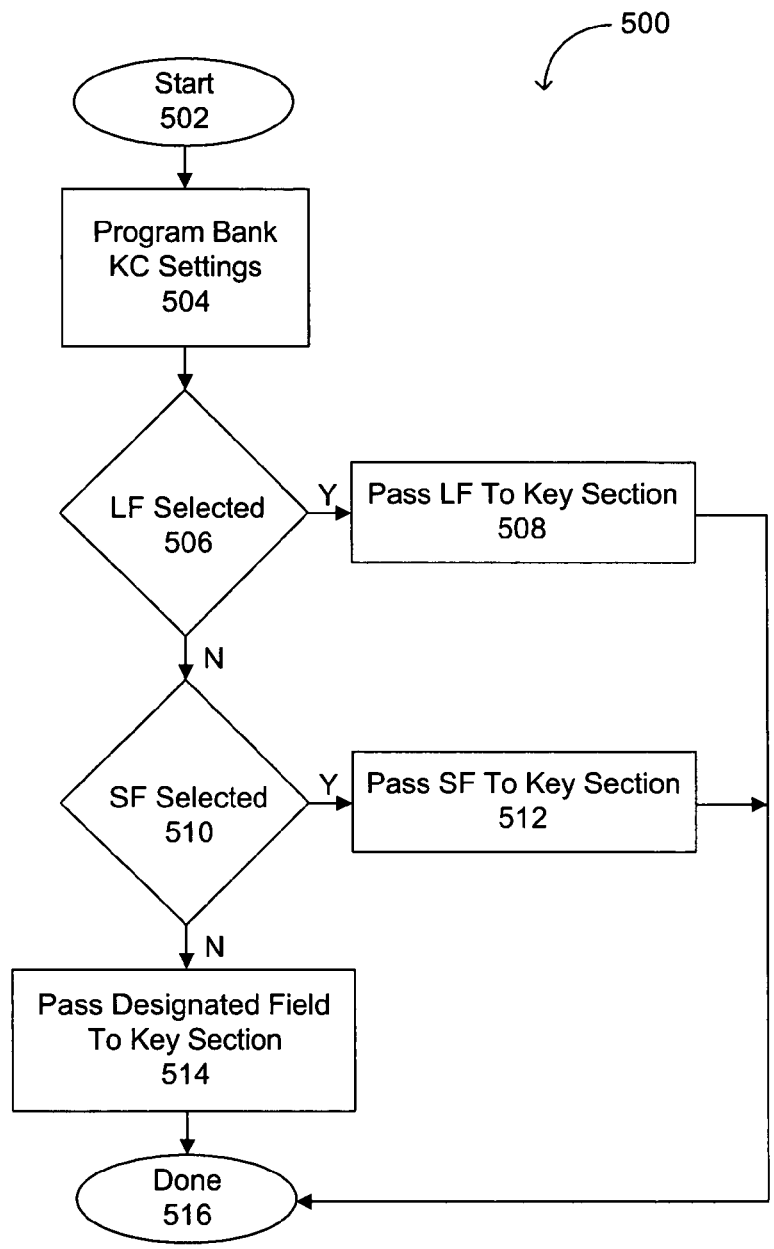
FIG. 5 is a flow diagram of a method of constructing a search key field according to embodiments of the invention.

Referring now to FIG. 5, a flow diagram of a method of constructing a search key field according to embodiments of the invention is shown and indicated by the general reference character 500. The method can begin in Start 502 and the flow can proceed to step Program Bank Key Construction (KC) Settings 504. Next, the flow can proceed to decision box Long Field (LF) Selected 506. If LF selected, the flow can proceed to step Pass LF To Key Section 508 and then to Done 516. If LF is not selected, the flow can instead proceed to decision box SF Selected 510. If SF selected, the flow can proceed to step Pass SF To Key Section 512 and then to Done 516. If SF is not selected, the flow can instead proceed to step Pass Designated Field To Key Section 514 and then to Done 516 to complete the flow. In this fashion, a section of a search key for a memory bank may be substantially formed.

Advantages of the invention include a reduced die size component due to a more efficient and simplified multiplexer function as well as added flexibility by allowing user programming of packet header and/or attribute section allocation to the search memory banks. As an alternative to conventional approaches, such as those that strictly allow any location of a packet header to be muxed into any location in each memory bank, embodiments of the invention can provide: (i) a limited number of pre-selected long meaningful fields identified in the packet header to significantly reduce mux combinations without limiting key selections; (ii) short meaningful fields containing those fields not already included in the long fields; (iii) a limited number of total user fields (e.g., 2 or 4) with mapping to all memory banks that require fully programmable offset header bytes; and (iv) maximum flexibility and key generation combinations by providing independent selection of each 16-bit field.

Having disclosed exemplary embodiments and the best mode, modifications and variations may be made to the disclosed embodiments while remaining within the subject and spirit of the invention as defined by the following claims.

The invention claimed is:

1. A search key construction system, comprising:
a plurality of search key sections, wherein each section is coupled to an output of a first multiplexer having a first programmable control;
a second multiplexer having a second programmable control and an output coupled to the first multiplexer; and
a third multiplexer having a third programmable control and an output coupled to the first multiplexer.

2. The search key construction system of claim 1, wherein:
the plurality of search key sections is configured to substantially form a search key for a memory bank.

3. The search key construction system of claim 1, wherein:
the first programmable control includes a key source select configured to enable one of a first type path, a second type path, and a third type path.

4. The search key construction system of claim 3, wherein:
the first type path includes one of a plurality of designated section positions from a packet header.

5. The search key construction system of claim 3, wherein:
the second type path includes a short field from a packet attribute.

6. The search key construction system of claim 5, wherein:
the short field includes a width of at most 16-bits.

7. The search key construction system of claim 3, wherein:
the third type path includes a long field from a packet header.

8. The search key construction system of claim 7, wherein:
the long field includes a width of at least 128-bits.

9. The search key construction system of claim 1, wherein:
the second programmable control includes a short field selection signal.

10. The search key construction system of claim 1, wherein:
the third programmable control includes a long field selection signal.

11. The search key construction system of claim 1, wherein:
each of the plurality of search key sections is 16-bits wide.

12. The search key construction system of claim 2, wherein;
the memory bank includes Ternary Content Addressable Memory (TCAM).

13. The search key construction system of claim 2, wherein:
the memory bank includes Static Random Access Memory (SRAM).

14. A method of constructing a search key, comprising the steps of:
programming bank key construction settings,
passing a first type programmed field to a key section if a first type path is enabled;
passing a second type programmed field to the key section if a second type path is enabled; and
passing a third type field to the key section if the first type path and the second type path are both disabled.

15. The method of constructing a search key of claim 14, wherein:
the first type path includes a long field from a packet header.

16. The method of constructing a search key of claim 14, wherein:
the second type path includes a short field from a packet attribute.

17. The method of constructing a search key of claim 14, wherein:
   the third type field includes one of a plurality of designated section positions from a packet header.

18. A means for constructing a search key, comprising:
   a means for programming bank key construction settings;
   a means for passing a first type programmed field to a key section if a first type path is enabled;
   a means for passing a second type programmed field to the key section if a second type path is enabled; and
   a means for passing a third type field to the key section if the first type path and the second type path are both disabled.

* * * * *